(12) United States Patent
Heckmann et al.

(10) Patent No.: US 12,656,636 B2
(45) Date of Patent: Jun. 16, 2026

(54) WIDE ANGLE POCKELS CELLS AND USE THEREOF

(71) Applicant: Qioptiq Photonics GmbH & Co. KG, Goettingen (DE)

(72) Inventors: Hans-Georg Heckmann, Goettingen (DE); Frank Mueller, Munich (DE)

(73) Assignee: Excelitas Deutschland GmbH, Feldkirchen Munich (DE)

( * ) Notice: Subject to any disclaimer, the term of this patent is extended or adjusted under 35 U.S.C. 154(b) by 418 days.

(21) Appl. No.: 18/332,104

(22) Filed: Jun. 9, 2023

(65) Prior Publication Data

US 2023/0384626 A1      Nov. 30, 2023

Related U.S. Application Data

(63) Continuation of application No. PCT/US2021/063408, filed on Dec. 14, 2021.

(60) Provisional application No. 63/125,092, filed on Dec. 14, 2020.

(51) Int. Cl.
G02F 1/01 (2006.01)
G02F 1/03 (2006.01)

(52) U.S. Cl.
CPC .......... G02F 1/0322 (2013.01); G02F 1/0311 (2013.01)

(58) Field of Classification Search
CPC .... G02F 1/0136; G02F 1/0311; G02F 1/0322; G02F 1/29; G02F 1/31
See application file for complete search history.

(56) References Cited

U.S. PATENT DOCUMENTS

| | | | |
|---|---|---|---|
| 4,872,181 A | 10/1989 | Johnson et al. | |
| 2019/0204628 A1* | 7/2019 | Banks | G02B 27/286 |
| 2020/0335932 A1 | 10/2020 | Winters et al. | |

OTHER PUBLICATIONS

PCT/US2021/063408, Mar. 25, 2022, International Search Report and Written Opinion.
International Search Report and Written Opinion for International Application No. PCT/US2021/063408 mailed Mar. 25, 2022.

* cited by examiner

*Primary Examiner* — Joseph P Martinez
(74) *Attorney, Agent, or Firm* — Wolf, Greenfield & Sacks, P.C.

(57) ABSTRACT

A system for switching and collating light contains a focusing lens that focuses a laser. A first linear polarizer receives the focused beam and transmits the focused beam incoming light, polarized at plus 45 degrees, to a Pockels cell. The Pockels cell contains: a first Pockels cell crystal that follows the first linear polarizer; a first internal birefringent crystal plate that compensates for birefringence of the first Pockels cell crystal; a second internal birefringent compensation crystal plate that follows the first plate; and a second Pockels cell crystal, that follows the second plate. The second plate considerably compensates for birefringence of the second Pockels cell crystal. A second linear polarizer receives light from the Pockels cell and transmits light best if the light is polarized at minus 45 degrees to an optical fiber.

18 Claims, 12 Drawing Sheets

Focusing Lens (20)     Polarizer (22)     Analyzer (50)

Laser     Fiber (60)

Pockels Cell (30)

Benefits:
* Compact PC (smaller than beam)
* Smaller Crystals > cheaper
* Reduce / correct spherical aberration of Colli.

* Fiber can be polarization maintaining
* The analyzer/PBS might be positioned at the fiber exit Conventional switching and coupling laser light into a fiber Conventional switching laser light and coupling into a fiber using a PBS (similar to analyzer)

Fiber

Focusing Lens

Polarizing beamsplitter (16)

Polarizer

Pockels Cell

Laser

- PZ smaller than beam
- Reduce / correct spherical aberration of Colli.

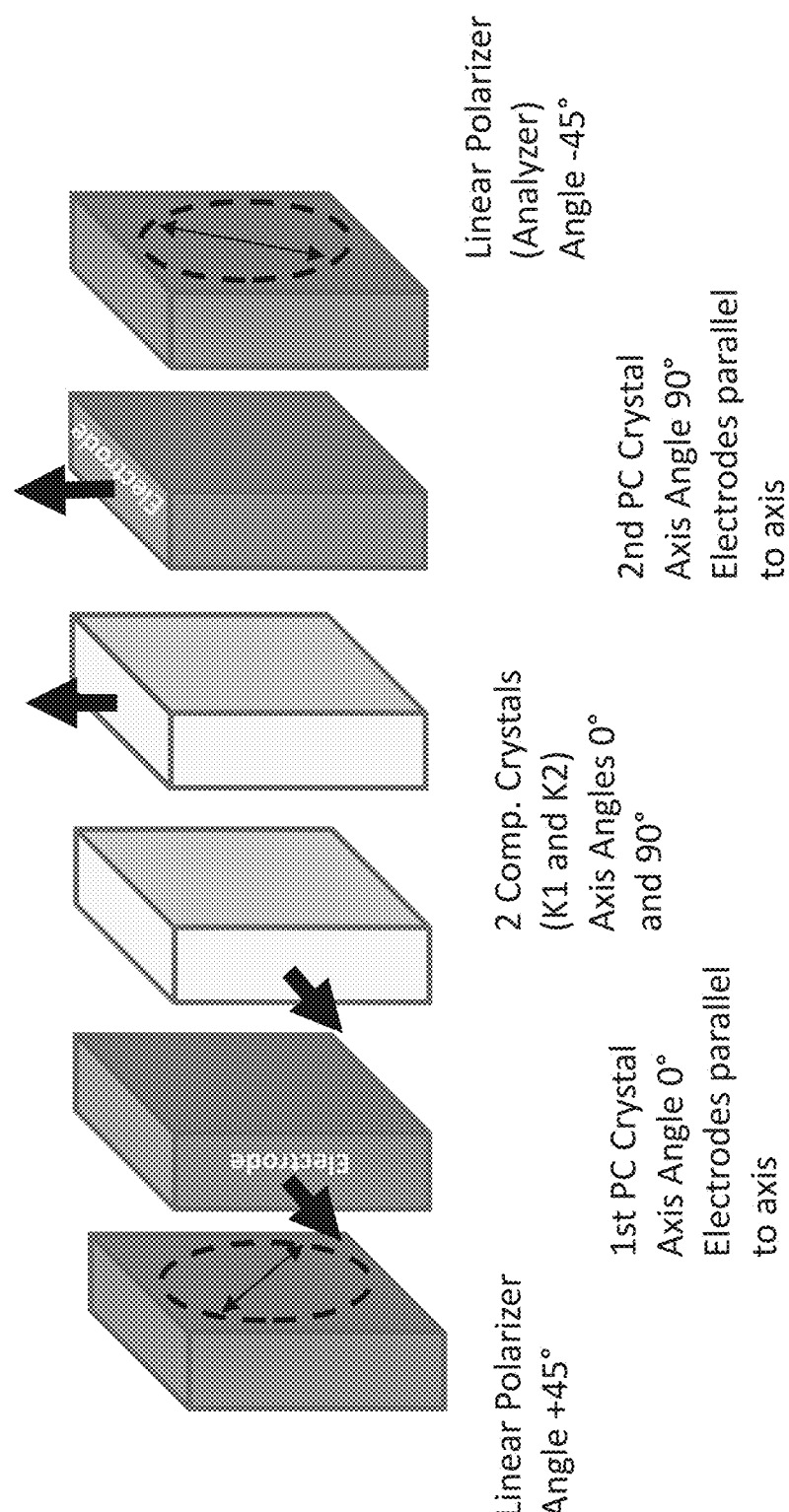
FIG. 6B: Wide Angle Pockels Cell
Linear Polarizer
Angle +45°
1st PC Crystal
Axis Angle 0°
Electrodes parallel
to axis
2 Comp. Crystals
(K1 and K2)
Axis Angles 0°
and 90°
2nd PC Crystal
Axis Angle 90°
Electrodes parallel
to axis
Linear Polarizer
(Analyzer)
Angle -45°

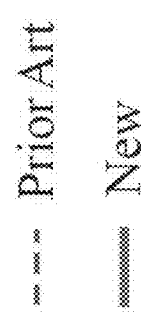
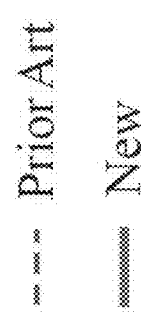
FIG. 6C

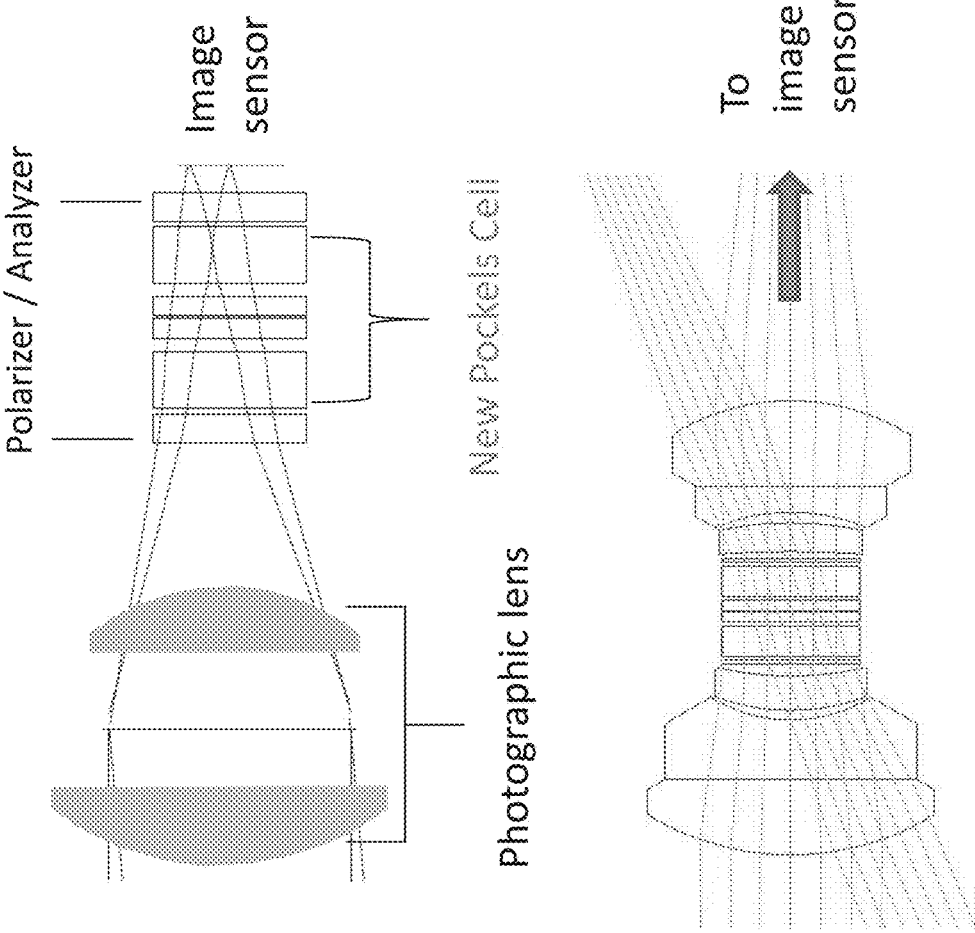
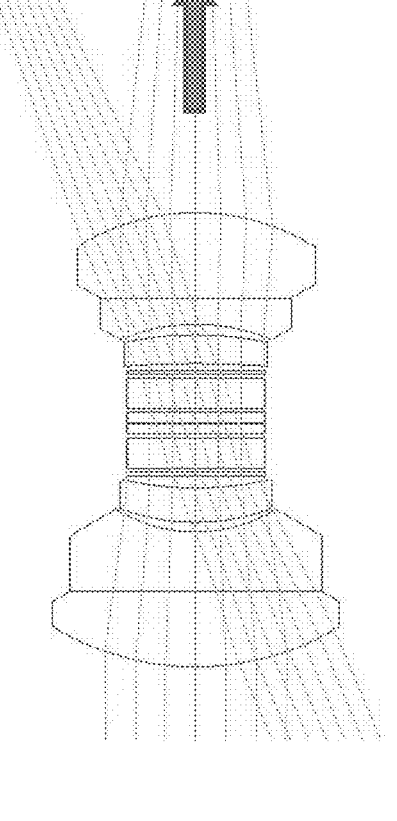
Photographic lens with shutter in front of image sensor:
FIG. 7A
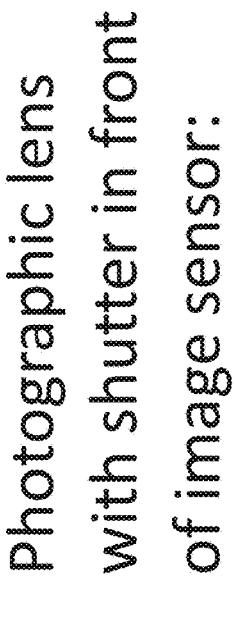
Shutter inside photographic lens:
FIG. 7B
- High speed shutter
- Very good contrast achievable over field-of-view available
- Pockels cell with high etendue Possible arrangements for a shutter in a photographic lens e.g. :

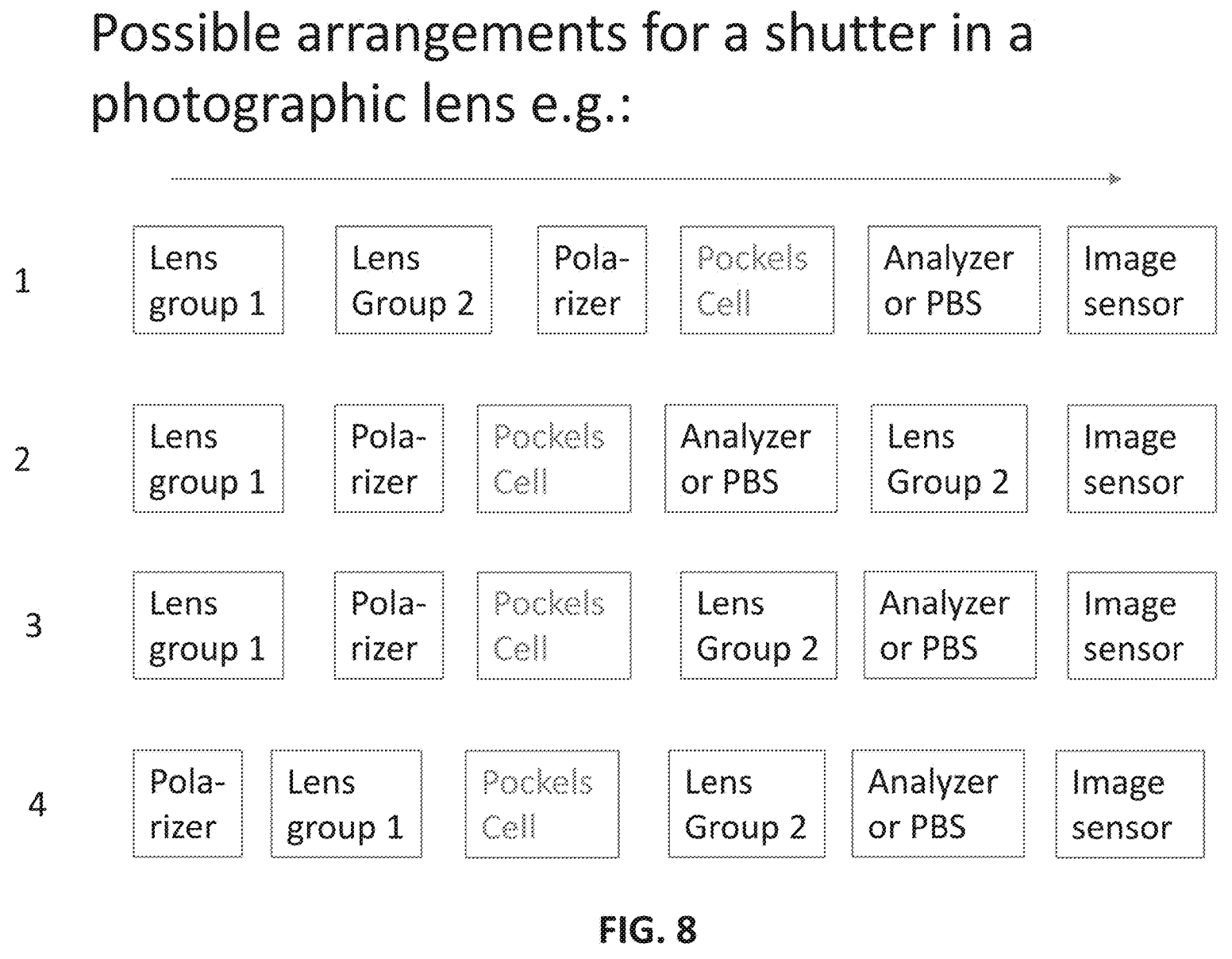

| # | | | | | | |
|---|---|---|---|---|---|---|
| 1 | Lens group 1 | Lens Group 2 | Pola-rizer | Pockels Cell | Analyzer or PBS | Image sensor |
| 2 | Lens group 1 | Pola-rizer | Pockels Cell | Analyzer or PBS | Lens Group 2 | Image sensor |
| 3 | Lens group 1 | Pola-rizer | Pockels Cell | Lens Group 2 | Analyzer or PBS | Image sensor |
| 4 | Pola-rizer | Lens group 1 | Pockels Cell | Lens Group 2 | Analyzer or PBS | Image sensor |

FIG. 8

Improving high-speed photography by cascading optics / PZ :

Lens

Sensor

Lin. Pol + PZ

PBS

Lin. Pol 90°

- As more components as higher the frame rate (fps)
- Short exposure time possible
- High etendue requires high angle PZ

WIDE ANGLE POCKELS CELLS AND USE THEREOF

CROSS-REFERENCE TO RELATED APPLICATION

This application claims priority under 35 U.S.C. § 120 to and is a continuation of International Application No. PCT/US2021/063408, filed Dec. 14, 2021, entitled WIDE ANGLE POCKELS CELLS AND USE THEREOF, which claims the benefit of priority to U.S. Provisional Patent Application No. 63/125,092, entitled WIDE ANGLE POCKELS CELLS AND USE THEREOF, which was filed on Dec. 14, 2020. The disclosure of each of the above-referenced applications is hereby incorporated by reference herein in its entirety.

FIELD OF THE INVENTION

The present invention relates to Pockels cells and systems and methods using Pockels cells, that will work well for rays that are not with low incidence angle.

BACKGROUND

Pockels cells are used to change, or rotate, the polarization state of light passing through when a voltage is applied to electrodes of electro-optic crystals within the Pockels cell. In combination with polarizing components, it is possible to electrically modulate the light transmission of the Pockels cell. With switching voltage between minimum ("off-state") and maximum transmission (on-state) it is possible to achieve extinction ratios (on/off) of 100:1 or better.

Most Transversal Pockels cells typically consist of two identical uniaxial crystals with the electric field being applied transversal to the direction of beam propagation. The second crystal compensates for birefringence of the first by turning its crystal axis by 90° azimuthally. For some transversal Pockels cells this compensation is not required. Longitudinal Pockels cells usually utilize only one crystal with the electric field applied in the direction of beam propagation.

Pockels cells are usually designed for low angles of incidence. The Pockels effect only works properly under this condition. For example, if a typical prior art Pockels cell is applied for modulating light-flux from a point source or receiver without any additional collimation optics then the extinction ratio (on/off) might be insufficient, because the polarization phase compensation by the crystal pair (respectively the intended phase for single crystal PZ) performs well only for the part of the rays within the bundle, which has a very low angle of incidence. An example of transmitted intensity vs angle of incidence (x,y) for a conventional Pockels cell followed by a polarization analyzer is provided by FIG. 1A. A radial display of the example of FIG. 1A is shown by FIG. 1B. The problem is that for incoming light having an incidence angle that is not approximately 0°, the prior art Pockels cell does a poor job at blocking polarized light, and therefore it is a poor optical switch for non-zero-degree incidence angle circumstances. Instead, it is desirable for a Pockels cell to be able to block all light. Doing so would allow a Pockels cell to be used for switching practically all angles in parallel.

The throughput of information and radiant flux of an optical system is related to the Etendue of the system. The latter is depending on the products of projected ray angles times space coordinates. If a certain amount of the Etendue is required and the angles have to be small, then the diameter has to be large (prior art).

FIG. 2 is a schematic diagram illustrating a prior art system for switching and coupling laser light into an optical fiber. As shown by FIG. 2, laser light is directed to a polarizer 2 for polarizing the incoming light. One having ordinary skill in the art will appreciate that if light entering the system is polarized light, a polarizer is not needed. Most often, light going into the Pockels cell 4 is monochromatic, collimated, and coming from a laser source.

Referring to FIG. 2, the polarized light then enters the Pockels cell 4. As is known by those having ordinary skill in the art, prior art transversal Pockels cells most often contain a first and a second electro-optic crystals 6, 8, which are connected to electrodes for receiving a voltage. The two electro-optic crystals of prior art Pockels cells are two identical uniaxial crystals where the second crystal compensates for birefringence caused by the first crystal by azimuthally rotating its crystal axis by 90°. This compensation for birefringence (the polarization state of incoming light under 0° is not changed by a zero voltage Pockels cell) takes place as long as the thickness of both crystals is the same. The second crystal 8 also helps to balance the effects of index changes by temperature, as long as the temperatures in both crystals 6, 8 are the same. In this example the Pockels cell 4 is placed between a polarizer 2 and an analyzer 10 to use it as a switch for light transmission. The orientation of the optical axis of the two crystals are +45° and −45° relative to the orientation of the first polarizer.

Light exiting the Pockels cell 4 is received by the analyzer 10 which transmits light depending on a predefined polarization stage, to a focusing lens 12. Light of a different polarization stage may be partially or nearly completely absorbed or reflected by the analyzer 10. The focusing lens then focuses the light to an optical fiber 14. One having ordinary skill in the art would appreciate that the laser light may be collimated light or may not be collimated light. Unfortunately, this prior art system, including the prior art Pockels cell, generally only works well for rays with low incidence angle, e.g. a collimated laser-beam close to 0° incident angle. Otherwise, there are regions with poor light blocking characteristics caused by angle dependent phase changes, also referred to as conoscopic interference. These undesirable phase changes typically reach their maximum in an azimuth of 45° (FIG. 1) relative to the orientation of the linear polarizers (direction of crystal axis from the two crystals).

FIG. 3 is a schematic diagram illustrating a second prior art system for switching and coupling laser light into an optical fiber. In the system of FIG. 3, the analyzer 10 is replaced by a polarizing beam splitter 16, which performs the same action as the analyzer 10 of FIG. 2.

Taking into account prior art Pockels cells, theoretically the conoscopic interference could be avoided, if the used crystals would be free of birefringence (if no voltage is applied). The little birefringence caused by the voltage to give the necessary half wave phase change normally would not be a serious matter. Unfortunately, this kind of "perfect crystal" with the required high electro-optical coefficients is not available. Therefore, there is a need in the industry to address one or more of these shortcomings.

SUMMARY

Embodiments of the present invention provide wide-angle Pockels Cells. Briefly described, the present invention relates to a system for switching and collating light. The system contains a focusing lens that focuses a laser. A first linear polarizer receives the focused beam and transmits the focused beam incoming light, polarized at plus 45 degrees, to a Pockels cell. The Pockels cell contains: a first Pockels cell crystal that follows the first linear polarizer; a first internal birefringent crystal plate that compensates for birefringence of the first Pockels cell crystal; a second internal birefringent compensation crystal plate that follows the first plate; and a second Pockels cell crystal, that follows the second plate. The second plate considerably compensates for birefringence of the second Pockels cell crystal. A second linear polarizer receives light from the Pockels cell and transmits light best if the light is polarized at minus 45 degrees to an optical fiber.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

FIGS. 6A and 6B are schematic diagrams further illustrating the Pockels cell system, which includes a first linear polarizer at the entry point of the transversal Pockels cell. Pockels cell response to an increase in incident angle is shown by FIG. 6C, where the abscissa is an angle (degrees) in the most problematic 45° azimuth (cross section of FIG. 1A).

FIGS. 7A and 7B are schematic diagrams illustrating examples of using the Pockels cell of the present invention for an image sensor.

FIG. 8 is a block diagram illustrating possible arrangements for use of the Pockels cell of the present invention in a shutter in a photographic lens.

DETAILED DESCRIPTION

As previously mentioned, the throughput of information and radiant flux of an optical system is related to the Etendue of the system. The latter is depending on the products of projected ray angles times space coordinates. If a certain amount of the Etendue is required and the angles have to be small, then the diameter has to be large. However, in accordance with the present system and method, by allowing higher ray angles, the Pockels Cell of the present system and method allows to achieve the same Etendue with smaller diameters compared to the prior art. Even if a high Etendue is not required, the new PZ might be much smaller than the prior art, because it is not restricted to work in nearly collimated low angle ray path. Instead it is able to work as well for example in a focused ray path. Usually smaller crystals are quite beneficial in many aspects (low switching voltage, availability and price of high-quality-material, packaging, etc.). Moreover, depending on the application, some components might be saved completely (e.g., collimation optics).

In addition, as previously mentioned, considering prior art Pockels cells, theoretically the conoscopic interference could be avoided, if the used crystals would be free of birefringence (if no voltage is applied). The little birefringence caused by the voltage to give the necessary half wave phase change normally would not be a serious matter. While this kind of "perfect crystal" with the required high electro-optical coefficients is not available, the present system and method simulates such kind of "perfect crystal" by the addition of crystal material with opposite birefringent characteristic (sign of ne-no).

Figure 4:
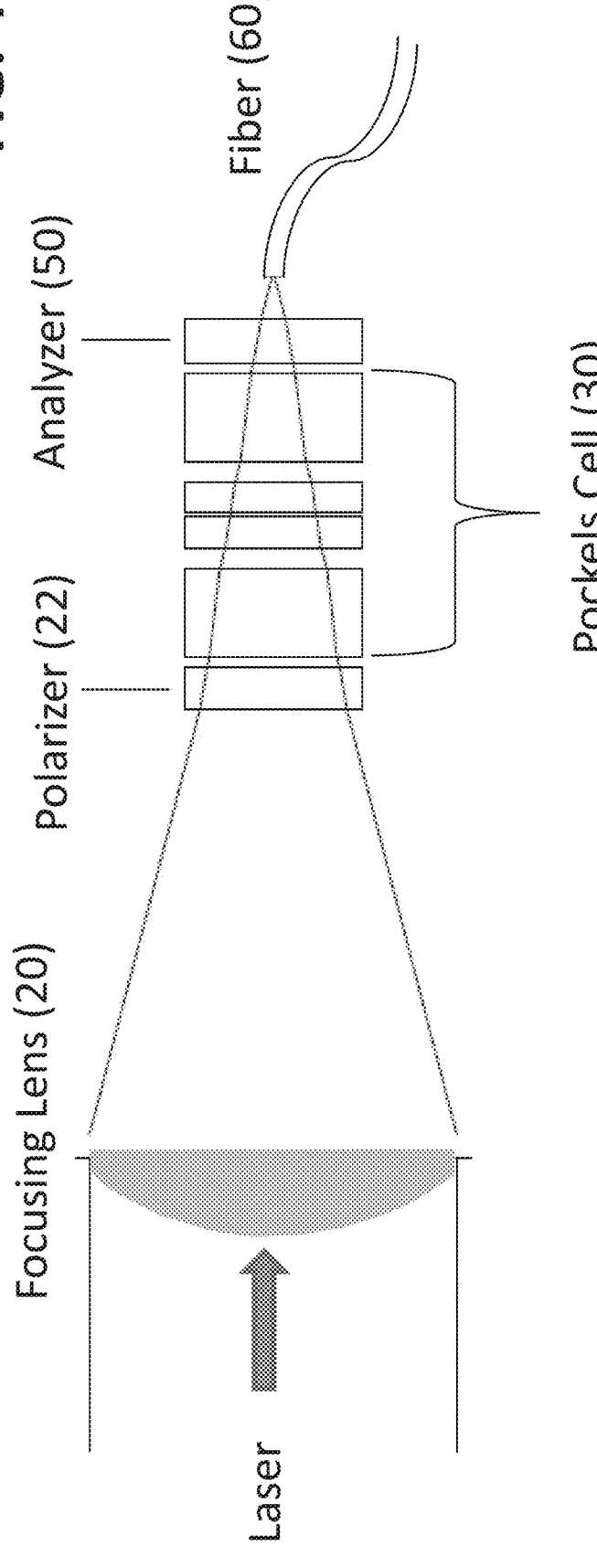
FIG. 4 is a schematic diagram illustrating switching and coupling a collimated beam to a fiber using the Pockels cell of the present invention.

FIG. 4 is a schematic diagram illustrating switching and coupling a collimated beam to a fiber using the Pockels cell of the present invention. Unlike prior art Pockels cells, the present Pockels cell does not require a collimated beam, although one may be used. Instead, the present Pockels cell may in fact be positioned within the focused beam path, which allows the Pockels cell of the present invention to be smaller than prior art Pockels cells, because the focusing lens makes the height of light entering the Pockels cell smaller. This is a product of having the Pockels cell to the right of the focusing lens where the beam diameter is made smaller, instead of the left, and also allows crystals within the Pockels cell to be smaller, thereby decreasing cost. The accommodated decrease in size of the crystals of the Pockels cell, as well as allowing the Pockels cell to be within the focusing lens focal path, allows for housing of the Pockels cell to be smaller as well. In fact, the Pockels cell can be smaller than the laser beam itself. Moreover the half wave voltage might be reduced accordingly (smaller diameter, same thickness), which might simplify the driver electronics.

As shown by FIG. 4, a laser, derived from a laser source, is directed toward a focusing lens 20, which focuses the laser beam to the present Pockels cell system. The present Pockels cell system includes a polarizer 22, the Pockels cell 30 of the present invention, and an analyzer 50. The polarizer 22 and analyzer 50 function in a manner similar to the prior art polarizer and analyzer, and therefore, will not be described again herein. The present Pockels cell 30 may be used with any polarizer or analyzer, and due to use in conjunction with the polarizer, the Pockels cell can be used as a very fast optical switch. As in the prior art, the analyzer 50 and/or polarizer 22 could be replaced by a polarized beam splitter. The analyzer 50 transmits light depending on a predefined polarization stage to an optical fiber 60. Light of a different polarization stage may be absorbed or reflected by the analyzer 50. The optical fiber 60 may be a polarization maintaining fiber, although this is not required. It is noted that should the analyzer be replaced by a polarized beam splitter, a second optical fiber may be in communication with the polarized beam splitter so that light of a different polarization stage than that allowed to pass through the polarized beam splitter to the first optical fiber, may be directed to the second optical fiber, or light of a second polarization stage is directed by the polarized beam splitter to the second optical fiber.

Figure 5:
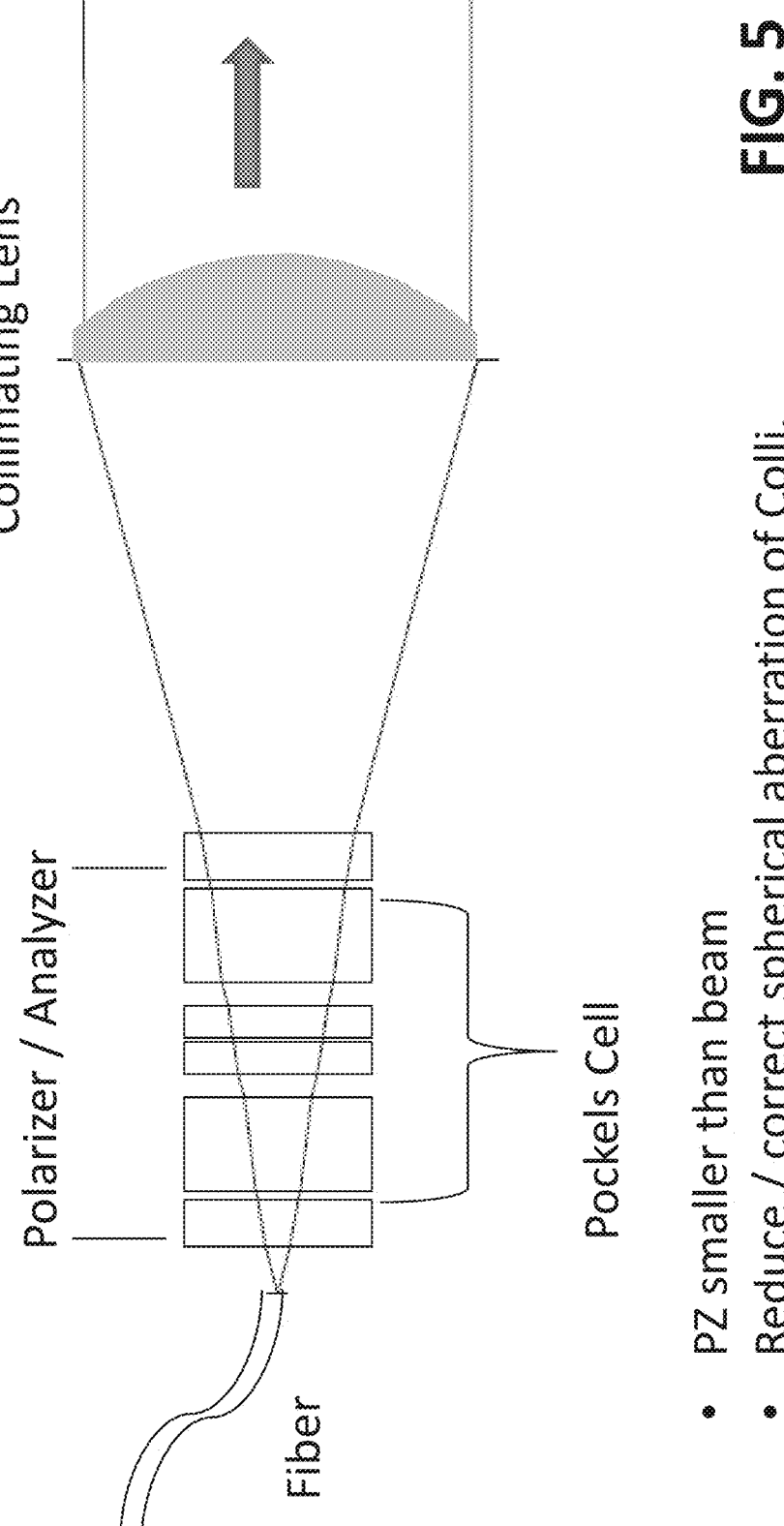
FIG. 5 is a schematic diagram illustrating an alternative configuration of a system for switching and collimating laser light out of a fiber via use of the present Pockels cell.

Unlike the prior art, the present system and method can receive uncollimated light, while prior art Pockels cell systems neither work with uncollimated light nor collimated light which is not parallel to the system optical axis because they are designed for incidence angles of approximately 0°. FIG. 5 is a schematic diagram illustrating an alternative configuration of a system for switching and collimating laser light out of a fiber via use of the present Pockels cell. As shown by FIG. 5, light from an optical fiber is fed into the polarizer of the Pockels cell system. Such light then traverses the Pockels cell and exits through the analyzer, where the light is directed toward a collimating lens for collimating the light that has traversed the Pockels cell system.

Figure 6A:
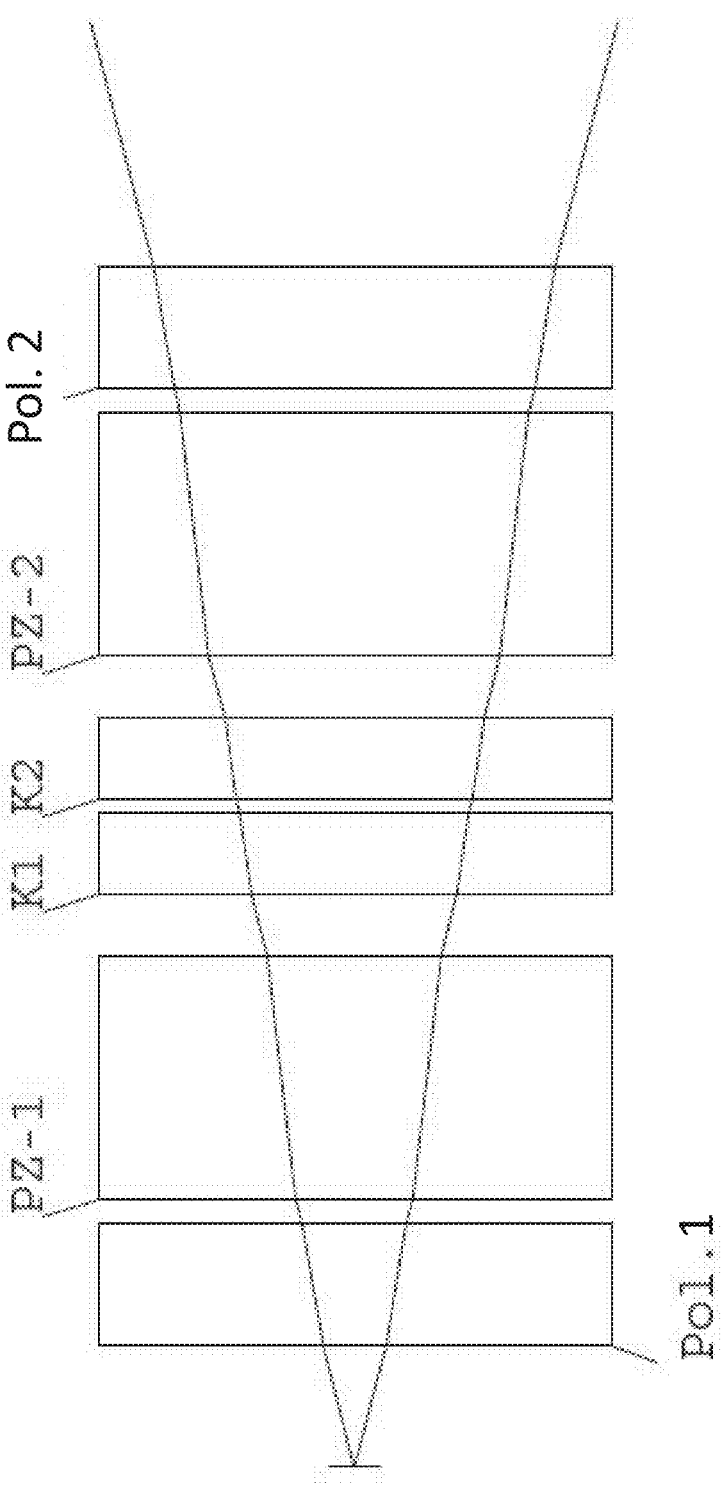

FIGS. 6A and 6B are schematic diagrams further illustrating the Pockels cell system, which includes a first linear polarizer (Pol. 1) at the entry point of the transversal Pockels cell. A second linear polarizer (Pol. 2), which is an analyzer or polarized beam splitter, is located after the Pockels cell. The first linear polarizer transmits incoming light polarized at plus 45 degrees, while the second linear polarizer transmits light best if polarized at minus 45 degrees.

A first Pockels cell crystal (PZ-1) follows the first linear polarizer (Pol. 1), and has an electrode connected thereto for providing a voltage to the crystal. The first crystal (PZ-1) has a crystal axis having an angle of zero degrees, which is parallel to the electrical field applied by the electrodes, in this example. One having ordinary skill in the art would appreciate that the crystal axis, depending on material used, need not be parallel to the electrical field applied by the electrodes.

Figure 1A:
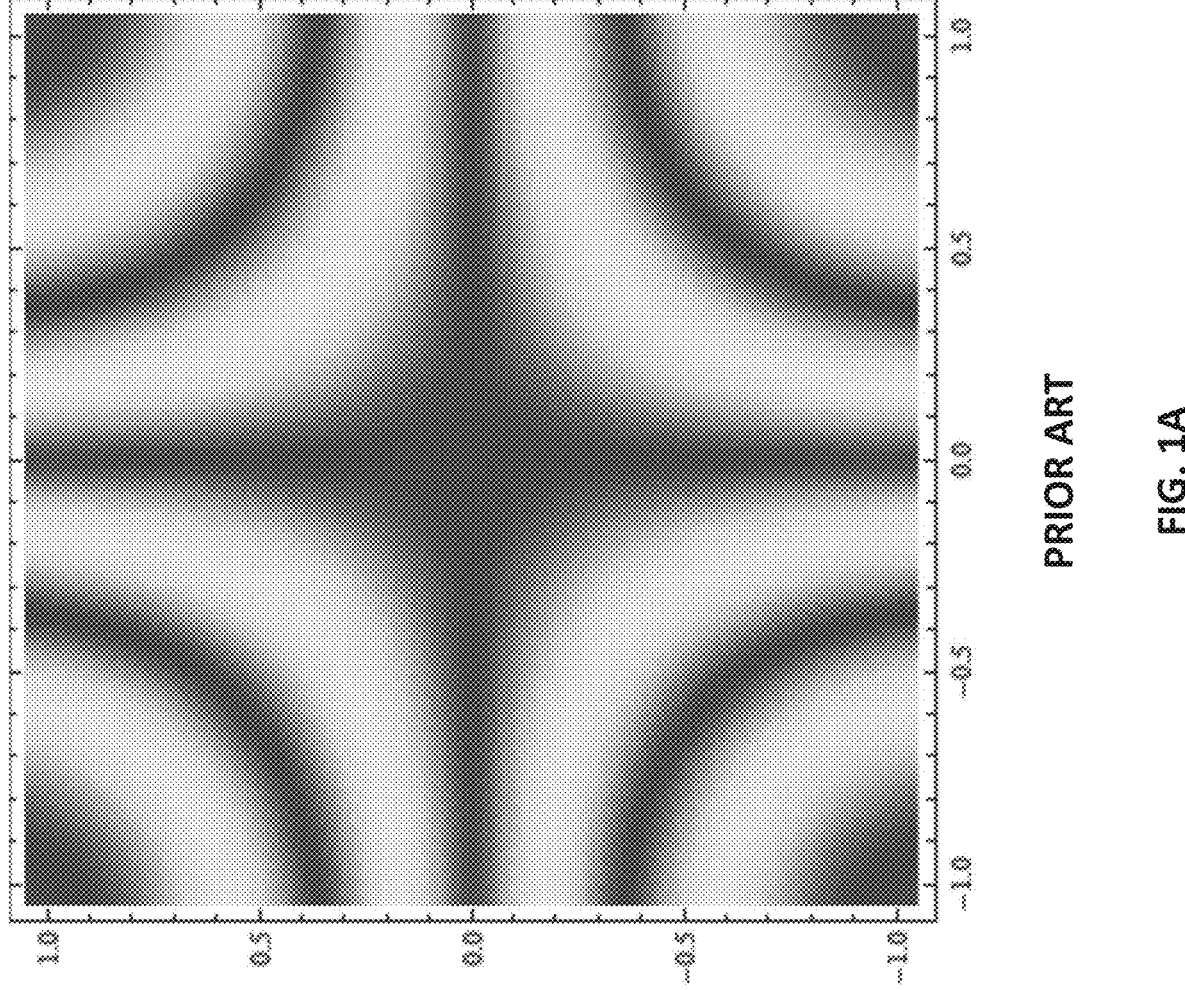
FIG. 1A is an example of transmitted intensity vs angle of incidence (x,y) for a conventional Pockels cell followed by a polarization analyzer.
Figure 1B:
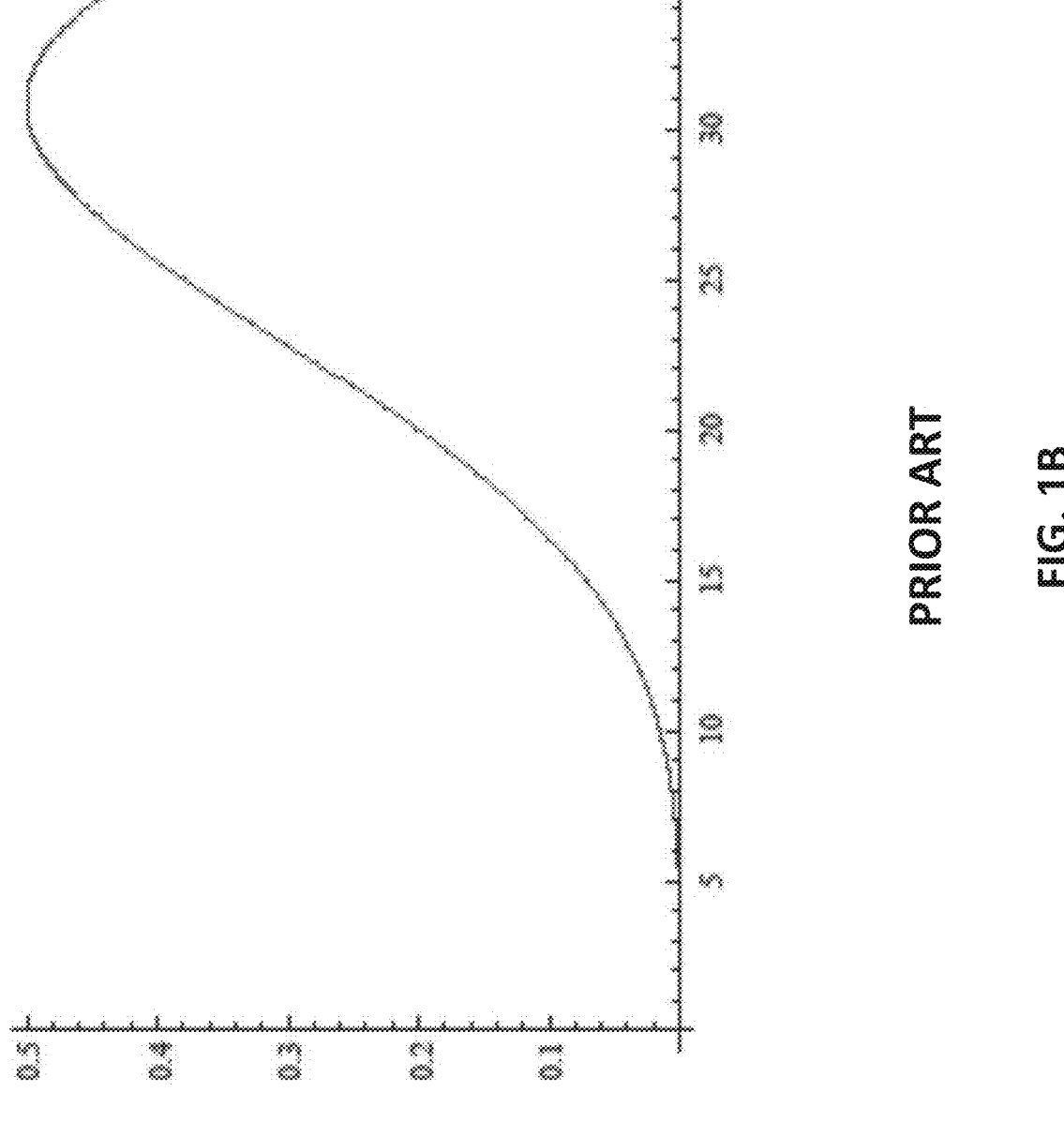
FIG. 1B is a radial display of the example of FIG. 1A.
Figure 2:
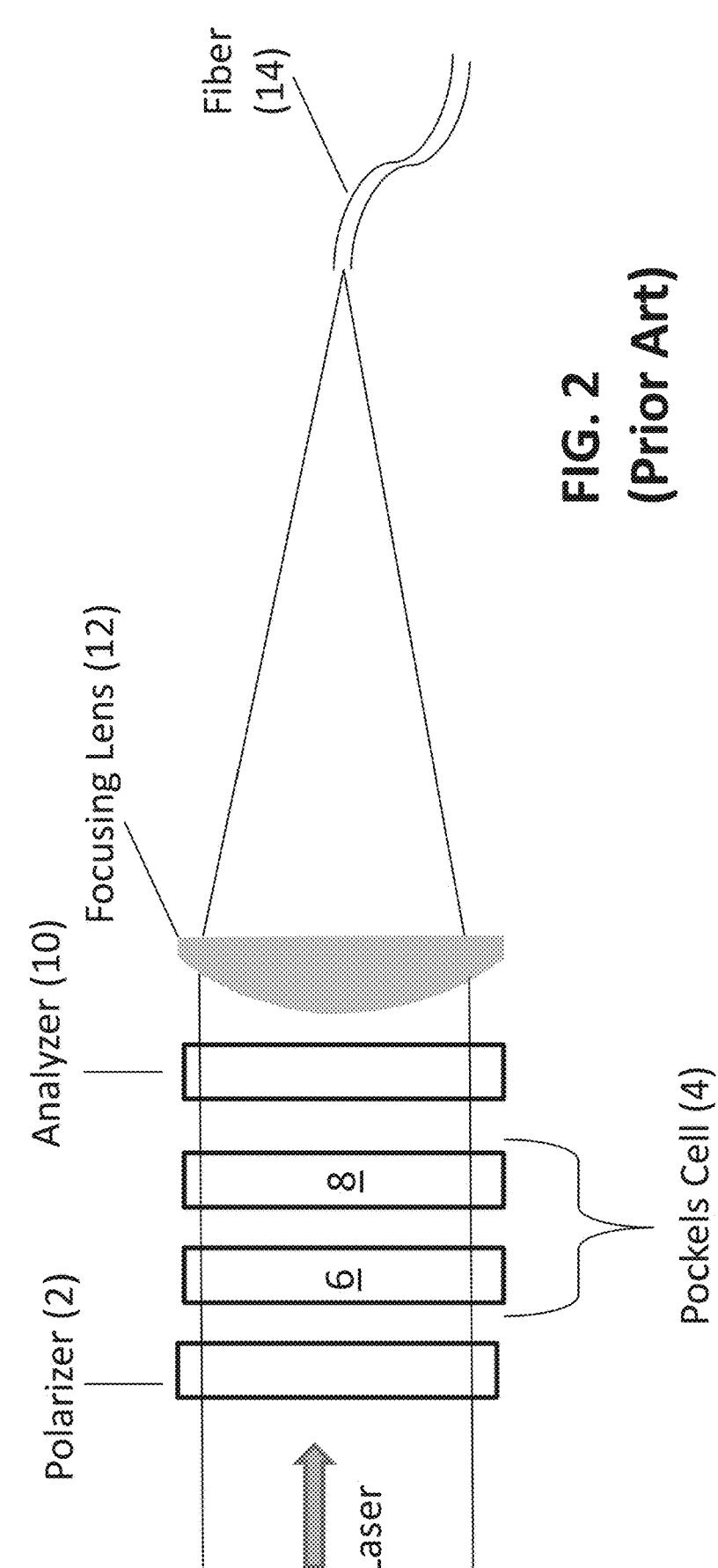
FIG. 2 is a schematic diagram illustrating a prior art system for switching and coupling laser light into an optical fiber.
Figure 3:
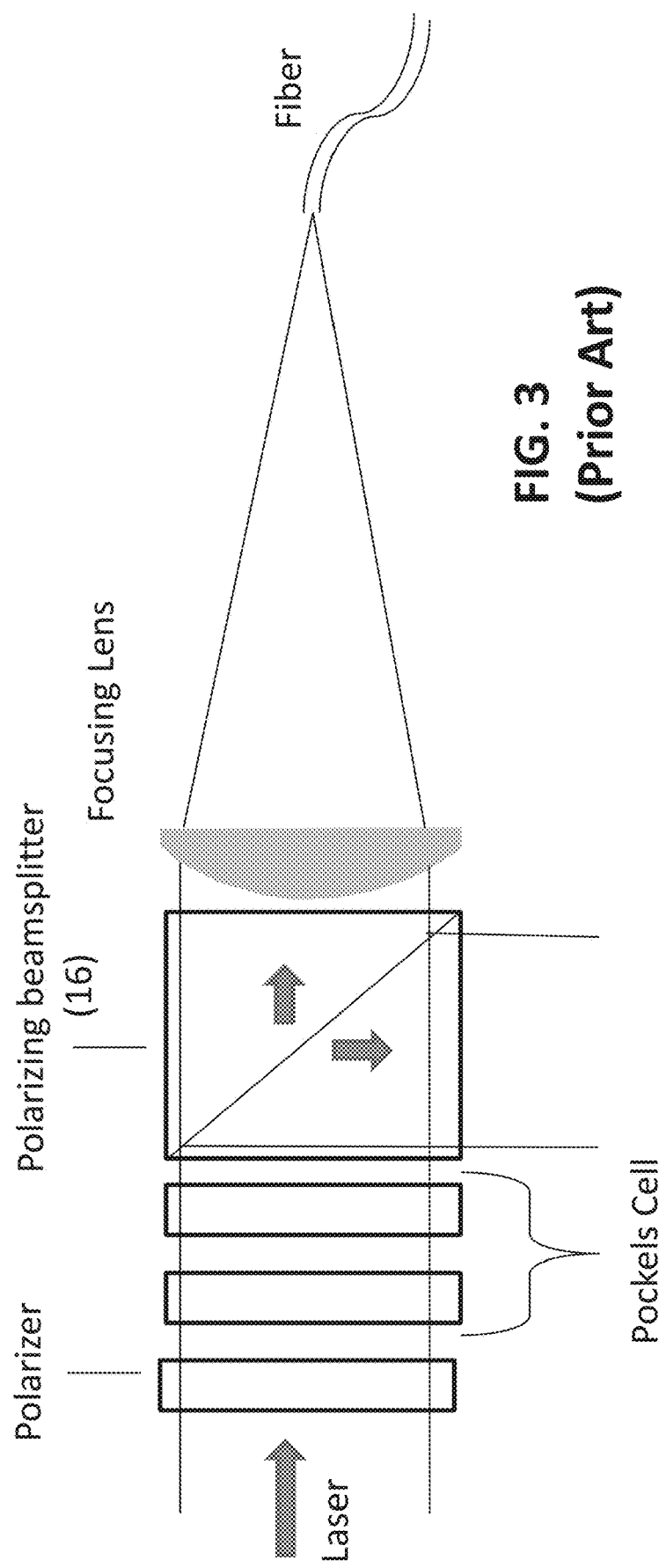
FIG. 3 is a schematic diagram illustrating a second prior art system for switching and coupling laser light into an optical fiber.

The first crystal (PZ-1) is followed by a first internal birefringent crystal plate (K1) which considerably compensates for the birefringence of PZ-1 if the ratio of the thicknesses is chosen properly. An example of such compensation of the present invention, in comparison to prior art Pockels cell response to an increase in incident angle is shown by FIG. 6C, where the abscissa is an angle (degrees) in the most problematic 45° azimuth (cross section of FIG. 1A).

Referring to the current Pockels cell, as shown by the solid line, light is blocked by the present Pockels cell. At about 40 degrees some light begins to come through. Alternatively, light blockage by the prior art Pockels cell, as demonstrated by the dashed line, happens in a sinusoidal pattern, thereby demonstrating that light is not consistently blocked at different angles.

A second internal birefringent compensation crystal plate (K2) follows the first internal birefringent crystal plate (K1), and, if the ratio of the thicknesses is chosen properly, performs the function of considerably compensating for the birefringence of a second Pockels cell crystal (PZ-2), that follows the second internal birefringent crystal plate (K2), and has an electrode connected thereto for providing a voltage to the crystal. The second Pockels Cell crystal (PZ-2) has a crystal axis having an angle of ninety degrees, which is parallel to the electrical field applied by the electrodes, in the current example. The orientation of crystal axis in the first crystal (PZ-1) and the compensator crystal (PZ-2) are parallel.

The ratio of the thicknesses is chosen properly if the following condition for the thickness dk of the first birefringent compensating crystal K1 is:

$$d_K = -d \frac{n_K^2 \Delta n}{n^2 \Delta n_K}$$

Where d is the thickness of the first Pockels cell crystal PZ-1, n is the ordinary index of refraction of the first Pockels cell crystal PZ-1, nk is the ordinary index of refraction of the first compensating crystal K1, $\Delta n$ is the birefringence (ne-no) of the first Pockels cell crystal PZ-1 and $\Delta nK$ is the birefringence of the first compensating crystal K1. The same condition has to be fulfilled for the second birefringent compensating crystal K2 with regard to the second Pockels cell crystal PZ-2 if this pair is present. The sequential arrangement of all components in-between the polarizers here is arbitrary. Thickness of K1 might refer to the thickness of PZ-2 and vice versa. It is only of importance that both conditions are fulfilled at the same time.

Generally, the electric field will be oriented (depending on the electro optical constants) in the direction with the maximum electro-optic effect on the refractive index for a maximum electro-optic birefringence. Potential other crystal properties, e.g. the piezo-effect, might be a reason not to use the direction of strongest electro-optic effect. The orientation of crystal axis in the PC-crystals and the respective birefringent compensator crystals are parallel. As already mentioned, the order of these four components is arbitrary. Since the switching voltages are very high (often in the range of several kilovolts), the birefringent compensator crystal plates may also be advantageous for insulating purposes, although this is not a required feature. As previously mentioned, the second linear polarizer (Pol. 2), which is an analyzer or polarized beam splitter, is located after the Pockels cell, and therefore, after the second Pockels cell crystal (PZ-2). The two additional birefringent crystal plates (K1, K2) of the present Pockels cell compensate for conoscopic interference, allowing for a higher incident light angle and a more compact design.

Common Pockels Cell crystal materials are, for example, but not limited to, LiTaO3, LiNbO3, RTP, BBO, KD*P or ADP; common birefringent crystals, in addition to the abovementioned electro-optical Pockels cell crystals are: Saphire, quartz, calcium carbonate, magnesium fluoride, or silicon.

The Pockels cell of the present invention may be used in multiple different environments. For example, light leaving the Pockels cell does not have to be transmitted to an optical fiber. Alternatively, such light may be transmitted to an image sensor as shown by FIGS. 7A and 7B. The system of FIG. 7A provides a photographic lens with the present PZ working as a shutter positioned before the image sensor. Due to the unique nature of the present Pockels cell to receive light that is not limited to having an incidence angle of approximately 0°, a wider field of view of the photographic lens can be used and the PZ might be placed in a collimated or a non-collimated ray path. The polarizer, Pockels cell, and analyzer all work in the same manner as previously described, except for the focus point of the analyzer being an image sensor instead of an optical fiber.

Unlike prior art Pockels cells, the present Pockels cell provides a good extinction ratio that is uniform over the image sensor. This is not possible by the prior art Pockels cells. For example, the image of FIG. 7A illustrates two different pathways of light entering the present Pockels cell, resulting in light hitting the image sensor at two different points. The present system and method allows the extinction ratio of the first and second pathways of light to be uniform.

Similar in application, the schematic diagram of FIG. 7B illustrates an embodiment where the present Pockels cell is located within a photographic lens, thereby providing a high-speed shutter (similar to FIG. 7A, where PC is in another place). In addition, the configuration of FIG. 7B provides very good extinction ratio over a field-of-view available.

The novelty of the present Pockels cell allows for many different arrangements for a shutter in a photographic lens, which would not be permissible with prior art Pockels cells. A first arrangement is to have a first lens group followed by a second lens group, which is followed by a Pockels cell system including a polarizer, the Pockels cell itself, and an analyzer. In principle, the polarizer and analyzer may be placed anywhere in the lens, but it in general is suggested to place them directly to the PZ to avoid interfering effects from remaining birefringence from lens materials. As previously mentioned, the analyzer may instead be a polarized beam splitter. Resulting light is directed to an image sensor. An example of this arrangement is provided by FIG. 8.

A second arrangement is to have a first lens group followed by a Pockels cell system including a polarizer, the Pockels cell itself, and an analyzer. Again, the analyzer may instead be a polarized beam splitter. Resulting light is directed to a second lens group, and then to an image sensor. A second arrangement is to have a first lens group followed by a Pockels cell system including a polarizer, the Pockels cell itself, and an analyzer. Again, the analyzer may instead be a polarized beam splitter. Resulting light is directed to a second lens group, and then to an image sensor. A third arrangement is to have a first lens group followed by a polarizer and then a Pockels cell. The Pockels cell is followed by a second lens group and then an analyzer or polarized beam splitter. Finally, an image sensor is located at the end of the third arrangement. A fourth arrangement begins with a polarizer, which is followed by a first lens group. A Pockels cell follows the first lens group and is followed by a second lens group, which is followed by an analyzer or polarized beam splitters. Finally, an image sensor is located at the end of the fourth arrangement. It should be noted that these arrangements are provided for exemplary purposes and the present invention is not intended to be limited to these arrangements. Regardless of the arrangement, the present Pockels cell is able to transfer at different angles of incident light, unlike prior art Pockels cells.

Figure 9:
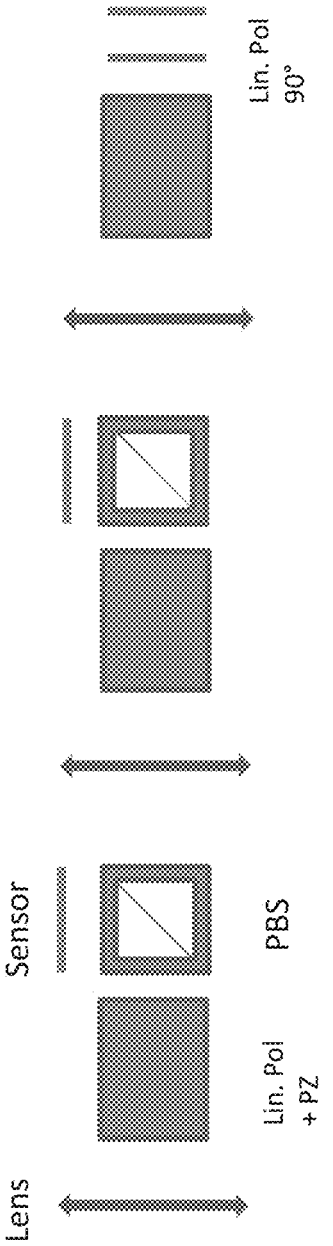
FIG. 9 shows an example, where the scene is directed to three different sensors by switching three PZ's in a cyclic manner to provide for high-speed photography by cascading optics.

The present PZ might also be useful to come over the frame rate limitation of high-speed cameras. FIG. 9 shows an example, where the scene is directed to three different sensors by switching three PZ's in a cyclic manner to provide for high-speed photography by cascading optics. Imagine the first two PZ's are switched to bypass the associated image sensors by use of the beam splitters depicted by the clear boxes with a single line angular line. Then the third PZ works as a very fast shutter and exposes a first image on the third sensor. Subsequently, the second and first PZ are taking their images by switching the other PZs. Meanwhile, the third sensor had the time to refresh and the process cycles again. For simplicity, the optics necessary to focus the scene to the different sensors is just symbolized by single lenses. Actually, it might be a complex optical arrangement placed at different locations or also in a quite simple manner by using beam splitters. It is noted that additional Pockels cells may be used in the high-speed cascading optics configuration. This configuration allows frame rate to be higher and exposure time can be very short. For some applications it might be advantageous to combine fast low-resolution cameras with much slower high-resolution cameras. Moreover, this principle might be useful for recording different spectral channels (one image sensor for each channel). If a single image sensor is used (e.g., like FIG. 7A, B) for different spectral channels (e.g., RGB-Sensor) the Pockels cell half wave voltage might be modulated to provide the maximum transmission for each channel in a time sequential manner synchronized to the image sensor read out process.

One having ordinary skill in the art would appreciate that use of the present Pockels cell can be for optical communication, modulating light for metrology purposes especially in semiconductors production and many other applications where 2- or 3-dimensional light analysis and monitoring are required.

The following provides non-limiting examples of building.

1. With two electro optical crystals (FIG. 7, 8):

| | Component | Material | Thickness [mm] |
|---|---|---|---|
| PZ-1 | first electro optical crystal | $LiTaO_3$ | 2.0 |
| K1 | first compensator | Sapphire | 0.7 |
| K2 | second compensator | Sapphire | 0.7 |
| PZ-2 | second electro optical crystal | $LiTaO_3$ | 2.0 |

Remarks: Wavelength 633 nm

2. With one electro optical crystal:

| | Component | Material | Thickness [mm] |
|---|---|---|---|
| PZ-1 | electro optical crystal | $LiTaO_3$ | 2.150 |
| K1 | compensator | Sapphire | 0.759 |

Remarks: Wavelength 633 nm; Phase shift 5λ

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for switching and collating light, comprising:

a focusing lens that receives a laser beam and focuses the laser beam, resulting in a focused beam;

a first linear polarizer that receives the focused beam and transmits the focused beam polarized at plus 45 degrees;

a Pockels cell comprising:

a first Pockels cell crystal, which follows the first linear polarizer, and has a first electrode connected thereto for providing a voltage to the first Pockels cell crystal;

a first internal birefringent crystal plate that at least partially compensates for birefringence of the first Pockels cell crystal;

a second internal birefringent compensation crystal plate that follows the first internal birefringent crystal plate; and a second Pockels cell crystal, that follows the second internal birefringent compensation crystal plate, and has a second electrode connected thereto for providing a voltage to the second Pockels cell crystal, wherein the second internal birefringent compensation crystal plate at least partially compensates for birefringence of the second Pockels cell crystal; and a second linear polarizer configured to receive light from the Pockels cell and transmit light based on a polarization stage to an optical fiber, wherein light of a different polarization stage may be absorbed or reflected by the second linear polarizer.

2. The system of claim 1, wherein the second linear polarizer is an analyzer.

3. The system of claim 1, wherein the second Pockels Cell crystal has a crystal axis having an angle of ninety degrees, which is parallel to an electrical field applied by the first and second electrodes.

4. The system of claim 1, wherein orientation of crystal axis in the first Pockels Cell crystal and the second Pockels Cell crystal are parallel.

5. The system of claim 1, wherein the Pockels cell is smaller than the laser beam.

6. The system of claim 1, wherein the optical fiber is a polarization maintaining fiber, and the second linear polarizer is configured to transmit light to the polarization maintaining fiber.

7. The system of claim 1, wherein the Pockels cell is positioned within a path of the focused beam.

8. The system of claim 1, wherein the second linear polarizer is a polarized beam splitter.

9. The system of claim 8, wherein the optical fiber is a first optical fiber, and the polarized beam splitter is configured to be in communication with a second optical fiber so that light of a different polarization stage than that allowed to pass through the polarized beam splitter to the first optical fiber, may be directed to the second optical fiber, or light of a second polarization stage is directed by the polarized beam splitter to the second optical fiber.

10. A system for switching and collimating laser light out of a fiber via use of a Pockels cell, comprising:

an optical fiber;

a first linear polarizer that receives a focused beam and transmits the focused beam polarized at plus 45 degrees;

a Pockels cell comprising:

a first Pockels cell crystal, which follows the first linear polarizer, and has a first electrode connected thereto for providing a voltage to the first Pockels cell crystal;

a first internal birefringent crystal plate that at least partially compensates for birefringence of the first Pockels cell crystal;

a second internal birefringent compensation crystal plate that follows the first internal birefringent crystal plate; and a second Pockels cell crystal, that follows the second internal birefringent compensation crystal plate, and has a second electrode connected thereto for providing a voltage to the second Pockels cell crystal, wherein the second internal birefringent compensation crystal plate at least partially compensates for birefringence of the second Pockels cell crystal; and a second linear polarizer that receives light from the Pockels cell and transmits light based on a polarization stage to an optical fiber, wherein light of a different polarization stage may be absorbed or reflected by the second linear polarizer.

11. The system of claim 10, further comprising a collimating lens for collimating light received from the second linear polarizer.

12. The system of claim 10, wherein the second linear polarizer is a polarized beam splitter.

13. The system of claim 12, wherein the optical fiber is a first optical fiber, and the system further comprises a second optical fiber in communication with the polarized beam splitter so that light of a different polarization stage than that allowed to pass through the polarized beam splitter to the first optical fiber, may be directed to the second optical fiber, or light of a second polarization stage is directed by the polarized beam splitter to the second optical fiber.

14. The system of claim 10, wherein the second linear polarizer is an analyzer.

15. The system of claim 10, wherein the second Pockels Cell crystal has a crystal axis having an angle of ninety degrees, which is parallel to an electrical field applied by the first and second electrodes.

16. The system of claim 10, wherein orientation of crystal axis in the first Pockels Cell crystal and the second Pockels Cell crystal are parallel.

17. The system of claim 10, wherein the Pockels cell is smaller than the laser light.

18. The system of claim 10, wherein the optical fiber is a polarization maintaining fiber.

* * * * *